(12) United States Patent
Chan

(10) Patent No.: US 10,400,471 B2
(45) Date of Patent: Sep. 3, 2019

(54) BELT ADJUSTMENT AND FIXATION HOOK

(71) Applicant: Duraflex Hong Kong Limited, Hong Kong (HK)

(72) Inventor: Yick Fai Chan, Hong Kong (HK)

(73) Assignee: Duraflex Hong Kong Limited, Hong Kong (HK)

( * ) Notice: Subject to any disclaimer, the term of this patent is extended or adjusted under 35 U.S.C. 154(b) by 141 days.

(21) Appl. No.: 15/539,755

(22) PCT Filed: Nov. 18, 2015

(86) PCT No.: PCT/CN2015/094927
§ 371 (c)(1),
(2) Date: Jun. 26, 2017

(87) PCT Pub. No.: WO2016/112740
PCT Pub. Date: Jul. 21, 2016

(65) Prior Publication Data
US 2017/0350154 A1 Dec. 7, 2017

(30) Foreign Application Priority Data
Jan. 12, 2015 (CN) .................. 2015 2 00185065 U

(51) Int. Cl.
*F16B 45/00* (2006.01)
*E04H 15/32* (2006.01)
*F16B 45/02* (2006.01)

(52) U.S. Cl.
CPC ............. *E04H 15/32* (2013.01); *F16B 45/00* (2013.01); *F16B 45/02* (2013.01)

(58) Field of Classification Search
CPC ................................ E04H 15/32; F16B 45/00
See application file for complete search history.

(56) References Cited

U.S. PATENT DOCUMENTS

| 479,026 | A | * | 7/1892 | Smeal | A44B 11/24 24/165 |
| 546,226 | A | * | 9/1895 | Cook | F16B 45/02 24/599.9 |
| 1,565,392 | A | * | 12/1925 | Powers | F16B 45/02 24/265 H |
| 2,942,315 | A | * | 6/1960 | Johnson | F16G 11/106 24/134 R |
| 5,365,642 | A | * | 11/1994 | Rekuc | F16B 45/00 24/598.7 |
| 5,598,956 | A | * | 2/1997 | Schenberg | A47G 25/08 223/1 |

(Continued)

*Primary Examiner* — Jason W San

(57) ABSTRACT

A belt adjustment and fixation hook (1), comprising a body (10), a hook portion (11), a limiting convex portion (12) and a belt installation frame portion (13); the body (10) has a first main surface (101) and a second main surface (102) opposite thereto; the body (10) is provided with a first through hole (103); the limiting convex portion (12) is located in the first through hole (103) and extrudes beyond the first main surface (101) to limit a support rod (2); and the belt installation frame portion (13) is connected to the body (10) to further connect to a belt (3). The belt adjustment and fixation hook (1) fits the support rods (2) having different diameters; in addition, the belt adjustment and fixation hook (1) is convenient to detach and replace the belt (3), thus improving user experiences and reducing costs.

10 Claims, 5 Drawing Sheets

(56) References Cited

U.S. PATENT DOCUMENTS

| | | | | |
|---|---|---|---|---|
| 5,758,392 | A * | 6/1998 | Anscher | B60R 7/005 24/599.9 |
| 6,279,208 | B1 * | 8/2001 | Gillis | E04H 15/64 24/265 H |
| 6,802,109 | B2 * | 10/2004 | Hede | A44B 11/28 24/165 |
| 7,181,809 | B1 * | 2/2007 | Kuo | F16B 2/005 24/265 H |
| 8,387,217 | B1 * | 3/2013 | Hinds | A63B 21/00065 24/134 R |
| D687,292 | S * | 8/2013 | Angel | D8/395 |
| 8,695,176 | B2 * | 4/2014 | Gangakhedkar | B60P 7/0823 24/265 H |
| D729,046 | S * | 5/2015 | Paik | D8/367 |
| 2004/0060155 | A1 * | 4/2004 | Selby | B62J 7/08 24/265 H |
| 2005/0108860 | A1 * | 5/2005 | Crane | A44B 13/02 24/329 |
| 2007/0158517 | A1 * | 7/2007 | King | A47F 5/0006 248/301 |
| 2007/0241253 | A1 * | 10/2007 | Chen | F16B 7/0433 248/304 |
| 2011/0010897 | A1 * | 1/2011 | Yacucha | B60P 7/0807 24/265 H |
| 2012/0297582 | A1 * | 11/2012 | Lee | A63B 21/0557 24/265 H |
| 2016/0317849 | A1 * | 11/2016 | Cowell | A62B 35/0068 |
| 2016/0369945 | A1 * | 12/2016 | Alcini | F16B 45/00 |
| 2016/0375842 | A1 * | 12/2016 | Yamamoto | B60R 21/216 24/289 |
| 2017/0265665 | A1 * | 9/2017 | Wright | F16B 2/10 |
| 2018/0080496 | A1 * | 3/2018 | Early | F16B 45/00 |
| 2018/0142724 | A1 * | 5/2018 | Choate | A62B 35/0075 |

\* cited by examiner

BELT ADJUSTMENT AND FIXATION HOOK

FIELD OF THE INVENTION

The present application relates to a field of outdoor products, and more particularly relates to a belt adjustment and fixation hook configured for connecting a belt of tent products or backpacks to a rod body or a pipe for drinking water.

BACKGROUND OF THE INVENTION

Nowadays the belt adjustment and fixation hook is mostly used in a field of products such as tents and pipes for drinking water of backpacks and configured for connecting fabrics to a support rod. Take the use in the tents for example. The belt adjustment and fixation hook is usually called as a tent hook which has a hook portion configured for hooking the support rod. However, the existing belt adjustment and fixation hook can cooperate with the support rod of a certain diameter, i.e., the support rod, of which the diameter is equal to the size of the hook portion of the belt adjustment and fixation hook, because when the diameter of the support rod is bigger, the support rod can not be arranged in the belt adjustment and fixation hook; and when the diameter of the support rod is smaller, the support rod easily moves in the hook portion, and even slides out of the belt adjustment and fixation hook, which leads to unstable connection. In additions, in the existing the belt adjustment and fixation hook, the support rod is only arranged into the hook portion in one direction or from a specific angle, which reduces user experience.

The belt adjustment and fixation hook has further a belt installation frame portion configured for being connected to a belt of products such as tents. The belt passes through the belt installation frame portion, and is fixed by sewing, so that the products such as tents are fixedly connected to the belt adjustment and fixation hook.

However in prior art, the belt installation frame portion doesn't have a structure of opening and closing. Take tents for example. When the belt adjustment and fixation hook is broken and needs be replaced, stitches of the belt of the tents must be taken out to make the belt be separated from the broken belt adjustment and fixation hook, and then the belt of the tents is fixed to a new tent hook again by sewing, which is very complex. In additions, nowadays, the belt of the tents configured for being connected to the belt adjustment and fixation hook is usually fixed below fabrics of waterproof tents by sewing. When the belt adjustment and fixation hook is replaced, in the process of removing stitches and sewing again, the waterproofing and sealing property of the tents is easily broken, which leads to water leakage of the tents. Therefore, as the belt adjustment and fixation hook is broken, it is easily caused that the whole tent is not used again, so that waste phenomena are caused.

Technical Problem

The technical problem of the present application is to provide a belt adjustment and fixation hook, which can fit support rods of different diameters, has wide applicability, and can hook the support rod in multi-directions and from multi-angles, aiming at the aforementioned defects in prior art. In additions, it is convenient to remove and replace the belt adjustment and fixation hook, which improves user experience and avoids unnecessary wastes.

Solutions of Solving Problems

Technical Solutions

The technical solutions of the present application for solving the technical problems are as follows: a belt adjustment and fixation hook is provided, wherein, the belt adjustment and fixation hook comprises: a body having a first main surface and a second main surface opposite thereto, wherein, the body is provided with a first through hole passing through from the first main surface to the second main surface; a hook portion connected to the body and bent towards one side where the first main surface is located, to be hook-shaped; a limiting convex portion connected to the body, wherein, the limiting convex portion is located in the first through hole and extrudes beyond the first main surface to limit a support rod; and the limiting convex portion is shiftable when the support rod is arranged in the hook portion, and is elastically recoverable after the support rod is detached; a belt installation frame portion, connected to the body and configured for being connected to the belt.

In one specific embodiment of the present application, the limiting convex portion includes an elastic sheet, and a first protruding portion is formed on a surface of the elastic sheet; and the first protruding portion is spherical and protrudes outwards, so that the limiting convex portion protrudes beyond the first main surface.

In one specific embodiment of the present application, a connecting rod is arranged on the limiting convex portion; and the limiting convex portion is shiftably and recoverably connected to the body through the connecting rod; when the support rod is arranged in the hook portion, the limiting convex portion cooperates with the hook portion to clamp the support rod.

In one specific embodiment of the present application, the hook portion has an inner main surface and an outer main surface opposite thereto; and the inner main surface is connected to the first main surface; a second protruding portion is arranged on an area facing the limiting convex portion of the inner main surface; and the second protruding portion is connected smoothly to a hook portion free end of the hook portion, so that a first guiding slanted surface is formed by the inner main surface on the hook portion free end, which is convenient for the support rod to be arranged in the hook portion.

Advantageously, the hook portion has at least one second through hole passing through the inner main surface and the outer main surface; and the second through hole extends from a hook portion base end of the hook portion to the hook portion free end of the hook portion.

In one specific embodiment of the present application, the belt installation frame portion comprises: a movable rod, wherein, one end of the movable rod is connected to the body, and the other end of the movable rod is a movable rod free end rotatable around a connection point between the movable rod and the body; a fixing hook, wherein, one end of the fixing hook is connected to the body, and the other end of the fixing hook is formed into a fixing hook opening configured for fixing the movable rod free end to limit the movable rod.

Advantageously, the movable rod is formed by being bent in advance to make the movable rod free end be deviated from the fixing hook opening and make the movable rod free end be located on a side opposite to the fixing hook opening of the fixing hook.

Furthermore, advantageously, at least one gap is defined in a side abutting the body of the movable rod.

Furthermore, advantageously, a fixing opening is defined in a side away from the body of the movable rod free end, which is configured to be fixed to the fixing hook to make the movable rod be limited by the fixing hook, when the movable rod is arranged on the fixing hook.

Advantageously, a second guiding slanted surface is arranged on an area facing the fixing hook opening of the body, which is convenient for the movable rod free end to slide into the fixing hook opening.

Advantageous Effects of the Invention

Advantageous Effects

When implementing the belt adjustment and fixation hook of the present application, the following advantageous effects can be achieved:

(1) In the process of arranging the belt adjustment and fixation hook on the support rod, the limiting convex portion can be elastically deviated from the body, so the limiting convex portion can fit support rods of different diameters. In additions, the limiting convex portion protrudes beyond the first main surface of the body, so the support rod can be prevented from sliding out of the hook portion.

(2) The spherical first protruding portion is arranged on the elastic sheet, which plays a guiding role, can guide the support rod inserted from different angles and in different directions to smoothly slide into the hook portion along a spherical protruding structure. Moreover, the spherical protruding structure can be ensured limit the support rods of different diameters.

(3) The elastic sheet is connected to the body through the connecting rod in the bottom, which can improve the elasticity of a limiting protruding portion and broaden the adaptation scope of the belt adjustment and fixation hook. When the support rod is arranged in the hook portion, the limiting convex portion cooperates with the hook portion to clamp the support rod.

(4) The second through hole is defined, which can reduce the weight of the whole belt adjustment and fixation hook and improve elasticity of the hook portion free end, so that the adaptive ability of the belt adjustment and fixation hook fitting the support rods of different diameters can be improved.

(5) The second protruding portion is designed to be used to cooperate with the first protruding portion, which can further limit the support rod reliably to prevent the support rod from sliding out of the hook portion.

(6) The design of the first guiding slanted surface plays a guiding role, which can guide the support rod inserted from different angles and in different directions to slide into the hook portion.

(7) The belt installation frame portion can toggle between an opening state and a closing state through fixation and separation of the movable rod and the fixing hook, so that the belt adjustment and fixation hook can be convenient to be detached or replaced, which improves user experience, prolongs a service life of the body of tents and avoids unnecessary wastes.

(8) Gaps can improve the elasticity of the movable rod, so that the movable rod can be easily deformed elastically under the action of an external force. Thus, the movable rod is easily pressed into the fixing hook, which reduces the needed pressure of closing the belt installation frame portion, which improves user experience. Moreover, gaps can effectively prevent the movable rod from being deformed under the action of a tensile force from the belt, and keep stabilization of the tensile force. In additions, gaps form a concave-convex structure on a surface of the movable rod, which is beneficial to increase a friction force and prevent the belt from sliding.

(9) The movable rod is formed by being bent. When the movable rod free end is arranged in the fixing hook, an elastic restoring force is generated by the movable rod, so that the movable rod free end can compress the fixing hook in a direction away from the fixing hook opening, which prevents the movable rod from sliding out of the fixing hook.

(10) The fixing opening is defined in the movable rod free end, which further ensures the reliable fixation between the fixing hook and the movable rod.

BRIEF DESCRIPTION OF THE DRAWINGS

Description of the Drawings

Figure 1:
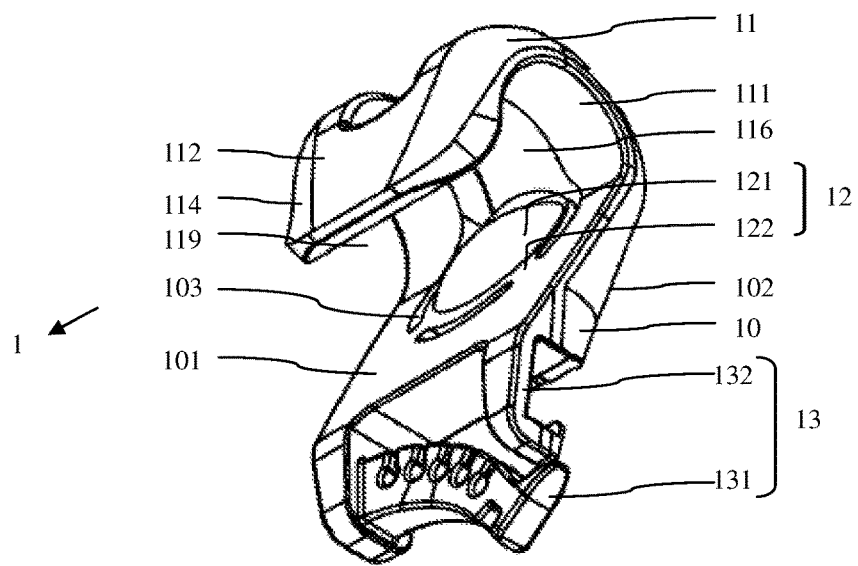
Figure 2:
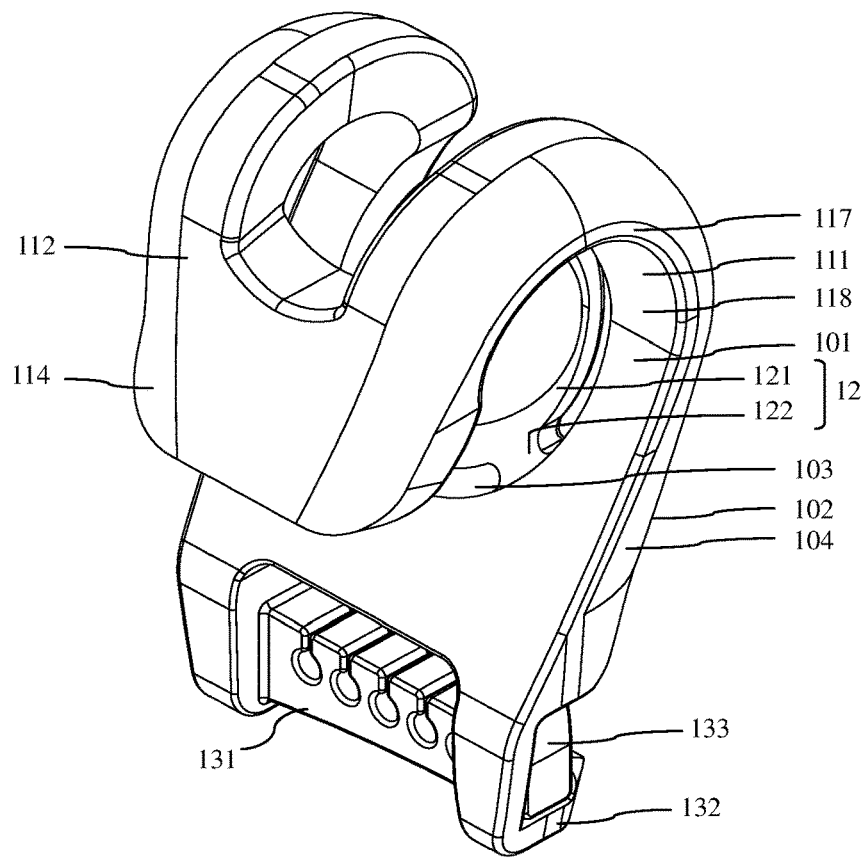
Figure 3:
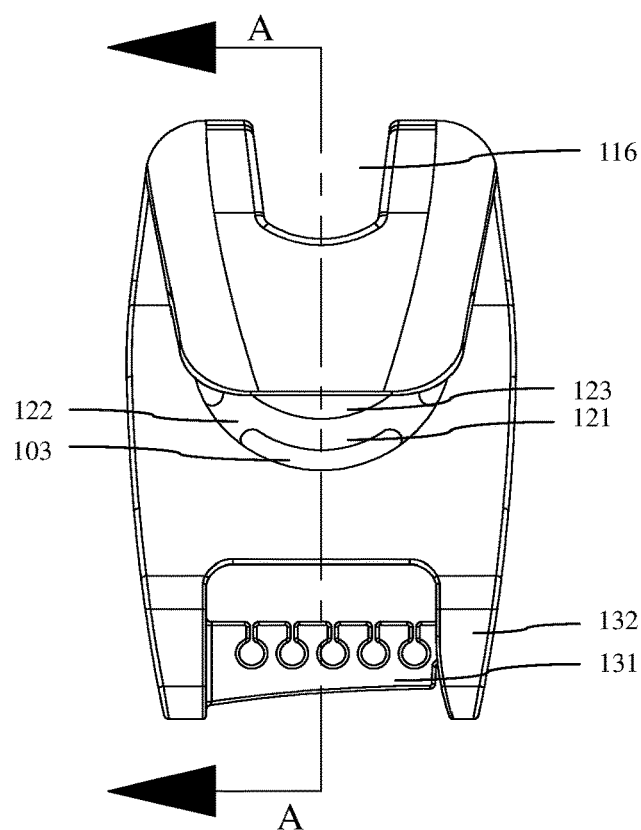
Figure 4:
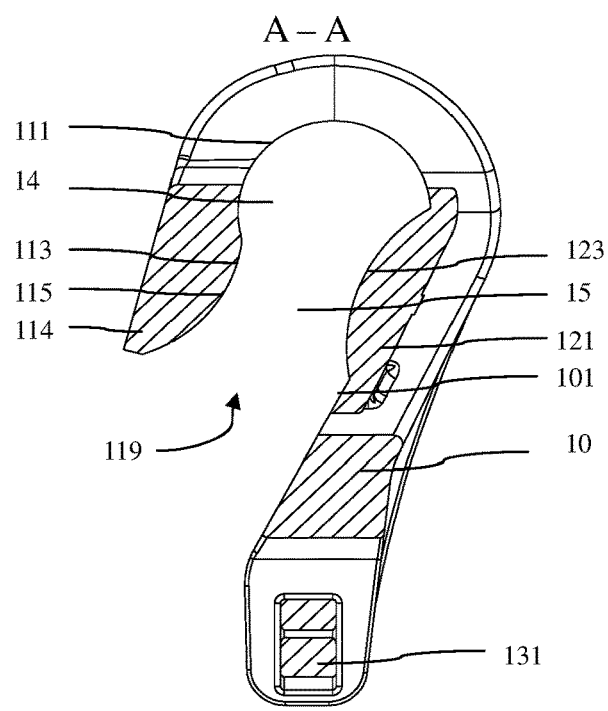
Figure 5:
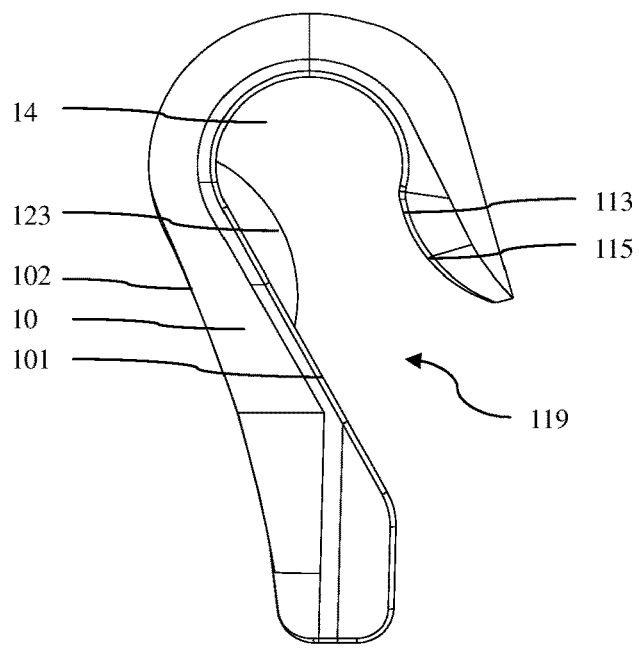
Figure 6:
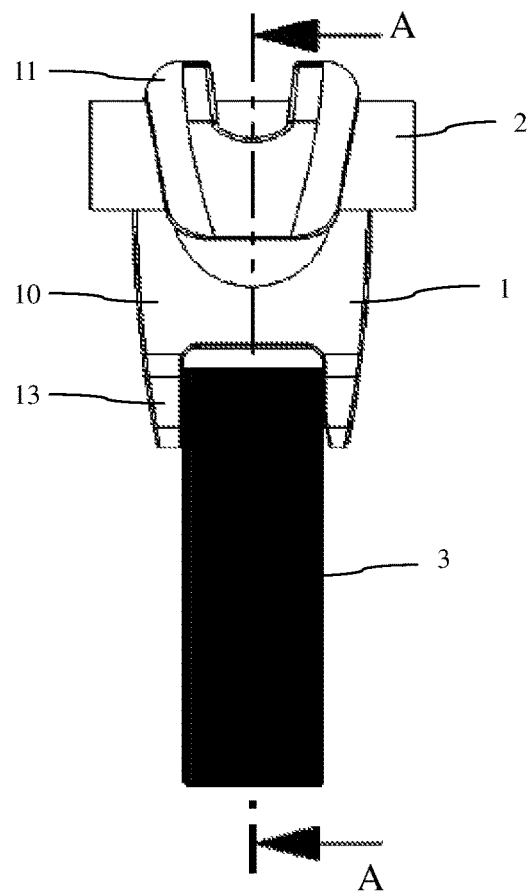
Figure 7:
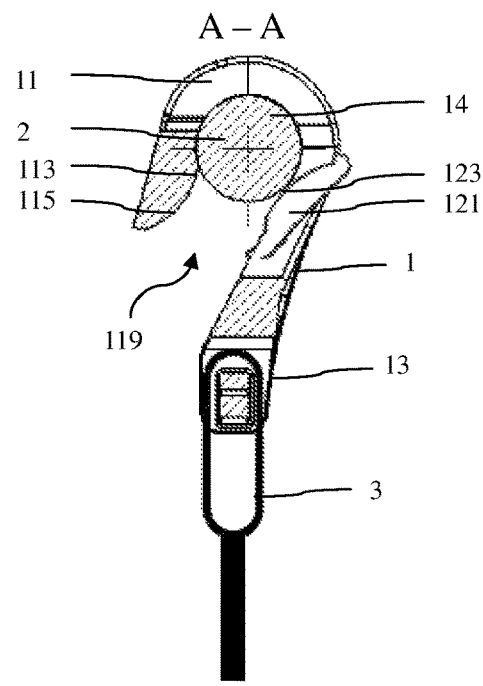
Figure 8:
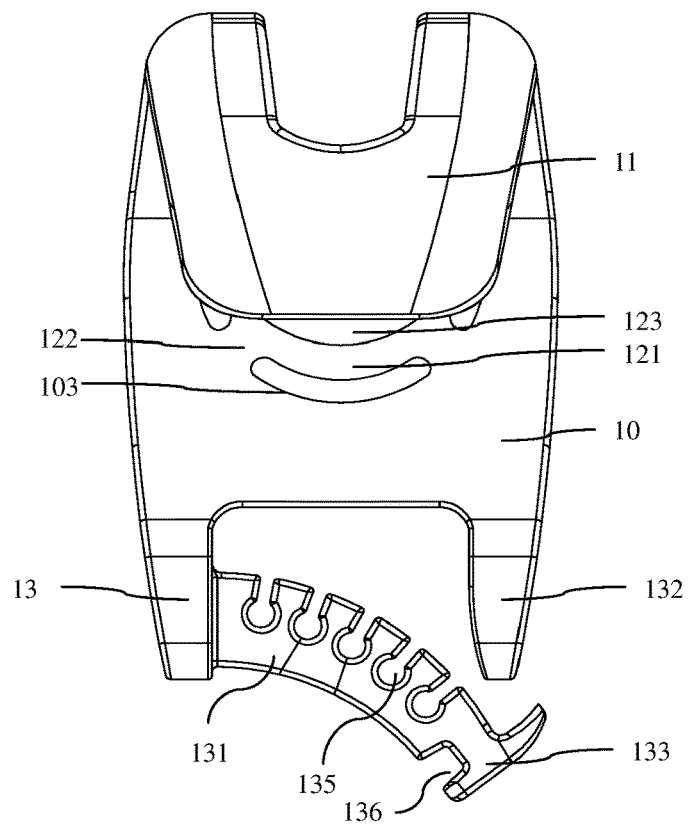
Figure 9:
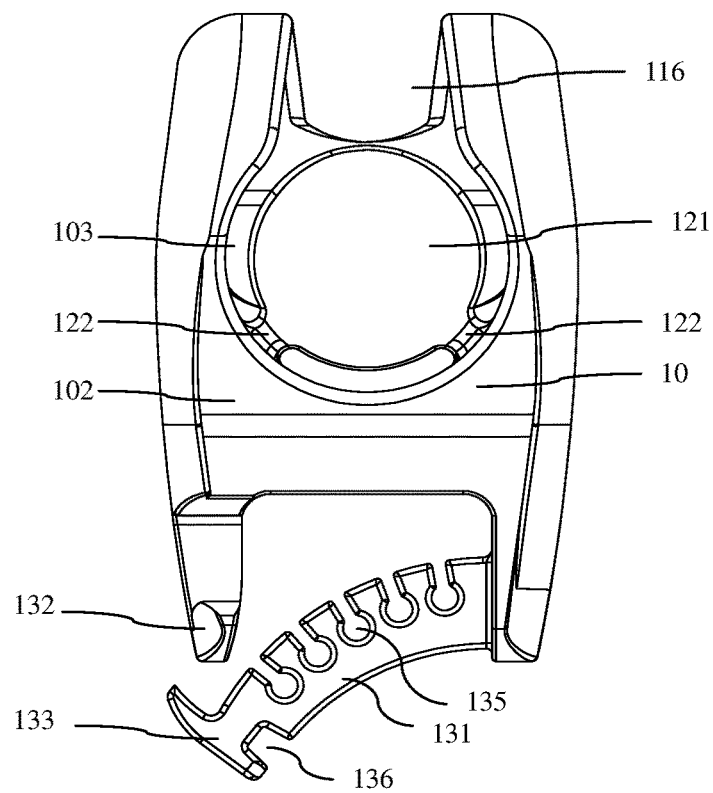
Figure 10:
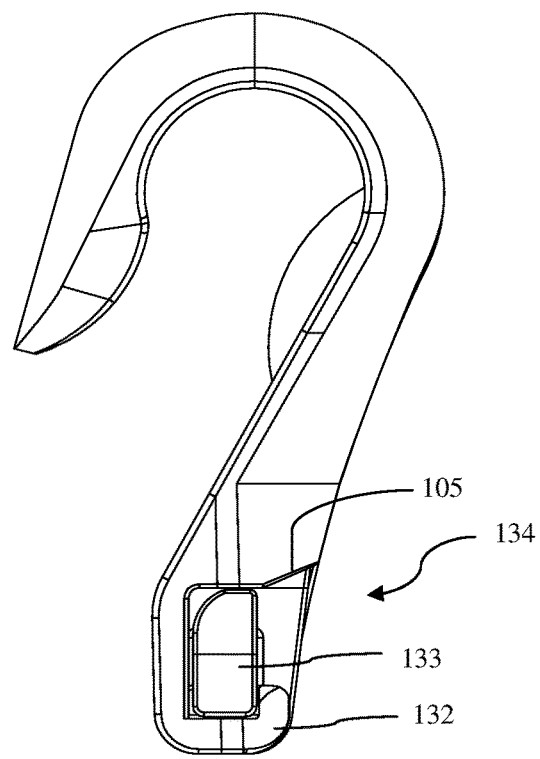

The present application will be further described with reference to the accompanying drawings and embodiments in the following, in the accompanying drawings:

FIG. 1 is a perspective view of a belt adjustment and fixation hook provided by a preferred embodiment of the present application;

FIG. 2 is another perspective view of the belt adjustment and fixation hook shown in FIG. 1;

FIG. 3 is a front view of the belt adjustment and fixation hook shown in FIG. 1;

FIG. 4 is a cross-section view along an A-A direction of the belt adjustment and fixation hook shown in FIG. 3;

FIG. 5 is a left view of the belt adjustment and fixation hook shown in FIG. 1;

FIG. 6 is a use state view of belt adjustment and fixation hook shown in FIG. 1;

FIG. 7 is a cross-section view along an A-A direction of the belt adjustment and fixation hook in a use state shown in FIG. 6;

FIG. 8 is a front view of the belt adjustment and fixation hook shown in FIG. 1, when a belt installation frame portion is in opening state;

FIG. 9 is a rear view of the belt adjustment and fixation hook shown in FIG. 1, when a belt installation frame portion is in opening state;

FIG. 10 is a right view of the belt adjustment and fixation hook shown in FIG. 1, when a belt installation frame portion is in closing state.

THE PREFERRED EMBODIMENT OF THE PRESENT INVENTION

Detailed Description of the Preferred Embodiment

To make the technical objective, solutions and effect of the present application be understood more clearly, now the specific implementation of the present application is described in detail with reference to the accompanying drawings and embodiments. It should be understood that the specific implementations described hereof are intended to be exemplary not to be limiting.

In the description of embodiments of the present application, terms of describing up-down and left-right directions are defined on the premise of a state of watching the belt adjustment and fixation hook from the front in FIG. 3, i.e., the up-down direction on the premise of watching FIG. 3 from the front is in accordance with the up-down direction described in the present specification, and the left-right direction on the premise of watching FIG. 3 from the front are in accordance with the left-right direction described in the present specification. In additions, FIG. 3 is used as references in describing another common term of directions, such as top, bottom, horizontal, vertical, horizontal direction and vertical direction, etc., all the time.

FIGS. 1-10 show a preferred embodiment of the present application, wherein, FIGS. 1 and 2 show perspective schematic views respectively from different angles when the belt installation frame portion 13 of the belt adjustment and fixation hook 1 is in an opening state and a closing state. The belt adjustment and fixation hook 1 is an integrated structure made of plastic material advantageously. It can be understood that the material of the belt adjustment and fixation hook is not limited to plastic or resin material, and can adopt metal material, composite material engineered from resin and metal or another common material.

As shown in FIGS. 1-3, the belt adjustment and fixation hook comprises a body 10, a hook portion 11, a limiting convex portion 12 and a belt installation frame portion 13.

The belt adjustment and fixation hook comprises a first main surface 101 based on the body 10, and a second main surface 102 opposite to the first main surface 101, which limits a thickness of the body 10. Moreover, the belt adjustment and fixation hook further includes an inner main surface 111 based on the hook portion 11, and an outer main surface 112 opposite to the inner main surface 111, which limits a thickness of the hook portion 11.

It can be seen clearly in FIGS. 1 and 2, the first main surface 101 is connected to the inner main surface 111, and the second main surface 102 is connected to the outer main surface 112. The first main surface 101 and the second main surface 102 of the body 10 are connected together through body side surfaces 104 arranged on the left and the right; and the inner main surface 111 and the outer main surface 112 of the hook portion 11 are connected together through hook portion side surfaces 117 arranged on the left and the right. It can be understood that the specific surface shapes of the first main surface 101, the second main surface 102, the body side surface 104, the inner main surface 111, the outer main surface 112 and the hook portion side surface 117 are arbitrary, and can be one of a plane surface, a curved surface, a rough surface and a concave-convex surface, etc., which is not specifically limited to the present application hereof.

In the embodiment, a first through hole 103 configured for accommodating the limiting convex portion 12 and supporting reciprocating movements of the limiting convex portion 12 is defined in the body 10; and the first through hole 103 passes through from the first main surface 101 to the second main surface 102.

The hook portion 11 is formed by extending outwards from an end of the body 10; and the hook portion 11 is bent towards a side of the first main surface 101 to form a J-shaped hook, which is configured for hooking a support rod 2 as shown in FIGS. 6 and 7, so that the belt adjustment and fixation hook 1 and the support rod 2 are connected detachably.

The hook portion 11 includes a hook portion base end 118 connected to the body 10 and a hook portion free end 114 away from the hook portion base end 118; and the hook portion free end 114 is suspended in the air, cooperates with the body 10 to form a first opening 119 facing adown, and is configured for hooking the support rod 2 when the support rod 2 slides into the hook portion 11. Under the action of an external force, the hook portion free end 114 can be rotated properly around the hook portion base end 118 based on its own elastic deformation ability, so that the size of the first opening 119 can be adjusted to fit support rods 2 of different diameters.

At least one second through hole 116 passing through from the inner main surface 111 to the outer main surface 112 is defined in the hook portion 11, and the second through hole 116 extends from the hook portion base end 118 to the hook portion free end 114. The second through hole 116 is defined, which can reduce the weight of the whole belt adjustment and fixation hook 1 and improve the elasticity of the hook portion 11 to enhance the adaptive ability of the belt adjustment and fixation hook 1 fitting the support rods of different diameters. Advantageously, the second through hole 116 is connected to the first through hole 103 to achieve the goals of reducing weight and improving the elasticity of the hook portion 11 at the extreme.

As shown in FIGS. 4, 5, 7 and 9, the limiting convex portion 12 is located in the first through hole 103 and protrudes beyond the first main surface 101 to limit the support rod 2. In the present embodiment, the limiting convex portion 12 includes an elastic sheet 121 and a connecting rod 122.

The elastic sheet 121 is configured for resisting and limiting the support rod 2, and has a shape adaptive to the first through hole 103, and an edge of the elastic sheet 121 is spaced with a side surface of the first through hole 103 at a certain gap, so that the elastic sheet 121 can be shifted freely in the first through hole 103 under the action of an external force; and when the support rod 2 is arranged in the hook portion 11, the elastic sheet 121 can cooperate with the hook portion 11 to clamp the support rod 2 under its own elastic restoring force. In the embodiment, as shown in FIG. 9, the elastic sheet 121 is a circular sheet structure, which is not limited to the present application; and the elastic sheet 121 can further be square, irregularly shaped, etc.

A first protruding portion 123 is arranged on a surface located on a side of the first main surface 101 of the elastic sheet 121, and the first protruding portion 123 is spherical and protrudes outwards, so that the limiting convex portion 12 protrudes beyond the first main surface 101. It can be understood that the first protruding portion 123 is not limited to a spherical protruding part, and can be another protruding structure having a common shape. The embodiment is only a preferred embodiment.

The spherical first protruding portion 123 plays a guiding role, which guides the support rod 2 inserted in the first opening 119 from different angles to smoothly slide into the hook portion 11 along a spherical protruding structure. Moreover, a cross sections of the common support rods 2 is mostly circular, and the spherical first protruding portion 123 can contact an outer circumferential surface of the support rods of different diameters all the time, so that the first protruding portion 123 can be ensured limit the support rods 2 reliably.

Advantageously, referring to FIGS. 4 and 5, a second protruding portion 113 is arranged on an area facing the limiting convex portion 12 of the inner main surface 111 of the hook portion 11. In the present embodiment, the second protruding portion 113 faces the first protruding portion 123, which is configured to form a limiting composite structure in the first opening 119 to clamp the support rod 2 and prevent the support rod 2 from sliding out.

In the absence of an external force, as a state when a minimum horizontal distance is formed between the first protruding portion 123 and the second protruding portion 113 is taken as a base, the space enclosed by the hook portion 11 is divided into two portions; and the top portion is called by an accommodating space 14, and the bottom portion is called by a guiding space 15.

Furthermore, advantageously, the second protruding portion 113 is connected smoothly to a hook portion free end 114, so that a first guiding slanted surface 115 is formed by the inner main surface 111 on the hook portion free end 114, the first guiding slanted surface 115 leans towards a direction away from the body 10 from the top down gradually, which plays a guiding role and is convenient for the support rod 2 to slide into the hook portion 11.

Referring to FIGS. 6 and 7, when the support rod 2 is arranged in the hook portion 11 through the first opening 119, the support rod 2 slides from the guiding space 15 into the accommodating space 14 gradually along a spherical surface of the first protruding portion 123 and the first guiding slanted surface 115. The elastic sheet 121 is elastically shifted away from the rear side of the second protruding portion 113 along a direction away from the hook portion free end 114 under the action of the force of the support rod 2; and the hook portion free end 114 is elastically shifted along a direction away from the front side of the body 10 under the action of a pressing force of the support rod 2. Moreover, under the action of elastic restoring forces of the limiting convex portion 12 and the hook portion 11 themselves, the first protruding portion 123 of the elastic sheet 121 and the second protruding portion 113 of the hook portion free end 114 both resist the support rod 2.

When the most of the support rod 2 slides into the accommodating space 14, the limiting convex portion 12 is deviated backwards, still resists the support rod 2 under the action of its own elastic restoring force, and provides an upturned component force to drive the support rod 2 to slide into the accommodating space 14 sequentially.

When the support rod 2 is arranged in the hook portion 11, as shown in FIG. 7, the limiting convex portion 12 still resists the support rod 2 under the action of its own elastic restoring force, and provides an upturned component force to the support rod 2 all the time to prevent the support rod 2 from moving down and sliding out along the first opening 119. Moreover, under the action of its own elastic restoring force, the limiting convex portion 12 makes the support rod 2 resist the inner main surface 111 to reduce movements of the support rod 2 in the accommodating space 14. In additions, a limiting composite structure is formed at a position of the minimum distance formed between the first protruding portion 123 and the second protruding portion 113, which further prevents the support rod 2 from sliding out.

When the support rod 2 is detached from the hook portion 11, the limiting convex portion 12 is elastically reset to a state shown in FIGS. 4 and 5 under the action of its own elastic restoring force.

The connecting rod 122 extends from a bottom edge of the elastic sheet 121 outwards, and is connected to a side surface in the first through hole 103, so that the limiting convex portion 12 is shiftably connected to the body 10 recoverably.

Referring to FIGS. 8 and 9, in the present embodiment, the elastic sheet 121 is connected to the body 10 via the two connecting rods 122 located on left side and right side of the bottom, and the two connecting rods 122 are arranged symmetrically, so that the elastic sheet 121 can shiftably rotate around a rotation axis which is a connecting line of two connection points between the two connecting rods 122 and the body 10.

In theory, the number of the connecting rod 122 is not limited by the present application; and only one connecting rod 122 is arranged below the elastic sheet 121 and is connected to the body 10 (not shown in Figures). However, this design makes the elastic sheet 121 not only be able to move around the connection point of the connecting rod 122 and the body 10 shiftably along a front-rear direction of abutting the hook portion free end 114 or leaving it, but also be rotated around a vertical direction because of uneven stresses. When the elastic sheet 121 is rotated around a vertical direction and moves shiftably along a front-rear direction at the same time, it can reduce a limiting effect to the support rod 2 and can not limit the support rod 2 reliably; and moreover, high stress concentrations at the connecting rod 122 is easily caused by eccentric rotation from several angles, which reduces a service life of the connecting rod 122 greatly.

It can be understood that as the connecting rod 122 must be arranged on the edge of a lower part of the elastic sheet 121, and an upper part of the elastic sheet 121 is a free end, which ensure the limiting convex portion 12 able to move shiftably along the aforementioned front-rear direction. If the upper part of the elastic sheet 121 is connected to the body 10 via the connecting rod 122, the limiting convex portion 12 will lose an elastic movable ability.

In the present embodiment, the bottom of the elastic sheet 121 is connected to the body 10 via the connecting rods 122 at intervals, not along the whole edge of the elastic sheet 121, which further improves the elasticity of limiting convex portion 12 moving in the front-rear direction through a hollowed-out design to fit the support rod 2 of a larger size range.

As shown in FIGS. 6 and 7, the belt installation frame portion 13 is configured to be connected to the belt 3 of tents.

In the present embodiment, referring to FIGS. 8 and 9, the belt installation frame portion 13 comprises a movable rod 131 and a fixing hook 132, and the belt installation frame portion 13 can be opened and closed through fixation and separation of the movable rod 131 and the fixing hook 132.

One end of the movable rod 131 is connected to the body 10, and the other end of the movable rod 131 is a rotatable movable rod free end 133 around a connection point between the movable rod 131 and the body 10.

An end of the movable rod 131 is arranged on the fixing hook 132 located on the body 10, and on the basis of FIG. 3, the fixing hook 132 is located on the right of the end face of the body 10, and the connection point of the movable rod 13 and the body 10 is located on the left of the end face of the body 10.

One end of the fixing hook 132 is integrally connected to the body 10, and the other end of the fixing hook 132 extending down away form the body 10 and then bent up to form a J-shaped hook structure. This fixing hook 132 has a fixing hook opening 134 facing the body 10 as shown in FIG. 10, which is configured for fixing in the movable rod free end 133 to limit the movable rod 131.

When the movable rod free end 133 is detached from the fixing hook 132, the belt installation frame portion 13 is opened. At this time, the belt 3 of tents can be separated from the movable rod 131 conveniently, or the belt 3 of tents can be mounted conveniently. When the movable rod free end 133 is arranged on the fixing hook 132 via the fixing hook opening 134, the belt installation frame portion 13 is closed, and the belt 3 of tents is fixed to the belt adjustment and fixation hook.

In the present embodiment, at least one gap 135 is defined in an upper part abutting the body 10 of the movable rod 131, which is configured for improving the elasticity of the movable rod 131, so that the movable rod 131 can be easily deformed elastically under the action of an external force.

Thus, the movable rod free end 133 is easily pressed into the fixing hook 132, which reduces the needed pressure of closing the belt installation frame portion 13 and improves user experience.

As shown in FIG. 6, the gap 135 is a circular through hole with a opening, and the circular through hole passes through the front end face and the rear end face of the movable rod 131; and the top of circular through hole extends upwards to the upper surface of the movable rod 131 to form the opening.

The gaps 135 are uniformly distributed on a side abutting the body 10 of the movable rod 131 at intervals. In the present embodiment, the number of the gaps 135 is 5, is not limited to 5, and can be determined according to actual design needs. The stress needed by closing the belt installation frame portion 13 is used as a design standard.

Advantageously, the movable rod 131 is formed by being bent in advance to make the movable rod free end 133 be located at a position far away from the fixing hook 132, i.e., the movable rod free end 133 can be automatically reset to be under the fixing hook 132 as shown in FIG. 8. Through this design, when the movable rod free end 133 is arranged in the fixing hook 132, an elastic restoring force is generated in the movable rod 131, so that the movable rod free end 133 can compress the fixing hook 132 down, which prevents the movable rod 133 from sliding out of the fixing hook opening 134 facing upwards.

As shown in FIG. 8, a fixing opening 136 is defined in a side far away from the body 10 of the movable rod free end 133, so that when the movable rod free end 133 is located in the fixing hook opening 134, the fixing opening 136 is configured for being arranged in the bottom of the fixing hook 132, and the movable rod 131 is limited by the fixing hook 132.

Advantageously, as shown in FIG. 8, a second guiding slanted surface 105 is arranged on the body 10 facing the fixing hook opening 134, so that the movable rod free end 133 slides into the fixing hook opening 134 smoothly under the action of a guiding role of the second guiding slanted surface 105.

In the present embodiment, the size of the fixing hook 132 is close to the size of the movable rod free end 133, so that the movable rod 131 can be fixed in the fixing hook 132 though its own plastic elasticity by way of interference fitting. When the fixing hook 132 is fixed to the movable rod free end 133, there is no gap configured for the movable rod 131 to move between the fixing hook 132 and the movable rod 131, so that the movable rod 131 is connected to the fixing hook 132 stably and reliably, and the movable rod 131 is prevented from sliding out effectively.

Referring to FIGS. 3 and 10 showing a schematic view when the belt installation frame portion 13 is in a closing state, and FIGS. 8 and 9 showing a schematic view when the belt installation frame portion 13 is in an opening state, a mounting process of the belt 3 of tents can be described as follows:

The belt 3 of tents and the body of tents can be sewed together, and then the belt 3 of tents is arranged on the movable rod 131; and at last, the movable rod free end 133 is pressed from the fixing hook opening 134 into the fixing hook 132. Thus, the belt 3 is mounted.

In the process of pressing, under the guiding role of the second guiding slanted surface 105, when the movable rod free end 133 gets close to the fixing hook 132 from several angles, the movable rod free end 133 can enter into the fixing hook 132 smoothly.

When the movable rod 131 is arranged to the fixing hook 132, the movable rod 131 is horizontally line-shaped; and several gaps 135 on the movable rod 131 are all in a compressed state, and openings on the upper surface of the movable rod 131 of gaps 135 are all closed, which can effectively prevent the movable rod 131 from being deformed when the movable rod 131 is pulled by the belt 3, and keep the pull force stable. Moreover, the openings of the gaps 135 form a concave-convex structure on the upper surface of the movable rod 131, which is beneficial to increase a friction force and prevent the belt 3 from sliding.

Moreover, the movable rod 131 is formed by being bent in advance into a shape as shown in FIG. 8, so that an elastic restoring force is generated in the movable rod 131 when the movable rod 131 is pressed and arranged in the fixing hook 132; and the movable rod free end 133 can compress the fixing hook 132 down, which prevents the movable rod 133 from sliding out of the fixing hook opening 134 facing upwards. In additions, the movable rod 131 is fixed in the fixing hook 132 through interference fitting, which further prevents the movable rod free end 133 from sliding out of the fixing hook opening 134.

When the belt adjustment and fixation hook 1 is broken and needs to be replaced, or the belt adjustment and fixation hook 1 needs to be separated from the belt 3 because of another need, the movable rod 131 in the fixing hook 132 should be pushed out of the fixing hook opening 134, and the movable rod 131 is reset to the state shown in FIG. 8 under the action of its own elastic restoring force; and then the belt 3 arranged on the movable rod 131 is detached from the movable rod free end 133, thus, the belt adjustment and fixation hook 1 can be separated from the belt 3 conveniently.

When implementing the belt adjustment and fixation hook of the present application, the following advantageous effects can be achieved:

(1) In the process of fixing the belt adjustment and fixation hook 1 to the support rod 2, the limiting convex portion 12 can be elastically shifted from the body 10, so the limiting convex portion 12 can fit support rods 2 of different diameters. In the process of fixing, under the action of its own elastic restoring force, the limiting convex portion 12 can further push the support rod 2 into the hook portion 11, which makes the fixing process effortless. In additions, the limiting convex portion 12 protrudes beyond the first main surface 101 of the body 10, so that the support rod 2 can be prevented from sliding out of the hook portion 11.

(2) The spherical first protruding portion 123 is arranged on the elastic sheet 121, which plays a guiding role, can guide the support rod 2 inserted from different angles and in different directions to smoothly slide into the hook portion 11 along the spherical protruding structure. Moreover, the spherical protruding structure can be ensured limit the support rods 2 of different diameters.

(3) The elastic sheet 121 is connected to the body 10 through the two connecting rods 122 located on the left side and right side of the bottom of the elastic sheet 121, so that the limiting convex portion 12 can move shiftably in the front-rear direction. This connecting structure can not only improve the elasticity of the limiting protruding portion 12, but also avoid high stress concentrations, so that the service life of the belt adjustment and fixation hook is prolonged.

(4) The second through hole 116 is defined, which can reduce the weight of the whole belt adjustment and fixation hook 1 and improve elasticity of the hook portion free end, so that the adaptive ability of the belt adjustment and fixation hook 1 fitting the support rod 2 of different diameters can be improved.

(5) The second protruding portion 113 is arranged on an area facing the limiting convex portion 12 of the hook portion 11, which is used to cooperate with the first protruding portion 123 and can further limit the support rod 2 reliably to prevent the support rod 2 from sliding out of the hook portion 11.

(6) The design of the first guiding slanted surface 115 plays a guiding role, which can guide the support rod 2 inserted from different angles and in different directions to slide into the hook portion 11.

(7) The belt installation frame portion 13 can toggle between an opening state and a closing state through fixation and separation of the movable rod 131 and the fixing hook 132, so that the belt adjustment and fixation hook can be convenient to be detached or replaced, which improves user experience, prolongs a working life of the body of tents and avoids unnecessary wastes.

(8) The gaps 135 can improve the elasticity of the movable rod 131, so that the movable rod 131 can be easily deformed elastically under the action of an external force. Thus, the movable rod 131 is easily pressed into the fixing hook 132, which reduces the needed pressure of closing the belt installation frame portion 13, which improves user experience. Moreover, gaps 135 can effectively prevent the movable rod 131 from being deformed under the action of a tensile force from the belt 3, and keep stabilization of the tensile force. In additions, the gaps 135 form a concave-convex structure on a surface of the movable rod 131, which is beneficial to increase a friction force and prevent the belt 3 from sliding.

(9) The movable rod 131 is formed by being bent. When the movable rod free end 133 is arranged in the fixing hook 132, an elastic restoring force is generated in the movable rod 131, so that the movable rod free end 133 can compress the fixing hook 132 in a direction away from the fixing hook opening 134, which prevents the movable rod 131 from sliding out of the fixing hook 132.

(10) The second guiding slanted surface 105 plays a guiding role, and is convenient for the movable rod free end 133 to slide into the fixing hook opening 134 smoothly.

(11) The fixing hook 132 is fixed to the movable rod free end 133 by way of interference fitting, which ensures the movable rod 131 be fixed to the fixing hook 132 stably and reliably, and effectively prevents the movable rod 131 from sliding out.

(12) The fixing opening 136 is defined in the movable rod free end 133, which further ensures the reliable fixation between the fixing hook 132 and the movable rod 131.

While the embodiments of the present application are described with reference to the accompanying drawings, the present application is not limited to the aforementioned embodiments. The specific implementations described hereof are intended to be exemplary not to be limiting. Under the inspiration of the present application, not beyond the scope of the spirit and claims of the present application, the skilled person can further develop many modifications, and all these modifications belongs to the scope of the present application.

The invention claimed is:

1. A belt adjustment and fixation hook, wherein, comprises:
a body (10) having a first main surface (101) and a second main surface (102) opposite thereto, wherein the body (10) is provided with a first through hole (103) passing through from the first main surface (101) to the second main surface (102);
a hook portion (11) connected to the body (10) and bent towards one side where the first main surface (101) is located, to be hook-shaped;
a limiting convex portion (12) connected to the body (10), wherein, the limiting convex portion (12) is located in the first through hole (103) and extrudes beyond the first main surface (101) to limit a support rod (2); and the limiting convex portion (12) is shiftable when the support rod (2) is arranged in the hook portion (11), and is elastically recoverable after the support rod (2) is detached;
a belt installation frame portion (13), connected to the body (10) and configured for being connected to the belt (3);
wherein the hook portion (11) includes a hook portion base end (118) connected to the body (10) and a hook portion free end (114) away from the hook portion base end (118); and the hook portion free end (114) is suspended in air, cooperates with the body (10) to form a first opening (119) facing adown for hooking the support rod (2) when the support rod (2) slides into the hook portion (11); wherein under the action of an external force, the hook portion free end (114) can be rotated properly around the hook portion base end (118) based on its own elastic deformation ability, so that a size of the first opening (119) can be adjusted to fit support rods (2) of different diameters.

2. The belt adjustment and fixation hook according to claim 1, wherein, the limiting convex portion (12) includes an elastic sheet (121), and a first protruding portion (123) is formed on a surface of the elastic sheet (121); and the first protruding portion (123) is spherical and protrudes outwards, so that the limiting convex portion (12) protrudes beyond the first main surface (101).

3. The belt adjustment and fixation hook according to claim 1, wherein, a connecting rod (122) is arranged on the limiting convex portion (12); and the limiting convex portion (12) is shiftably and recoverably connected to the body (10) through the connecting rod (122); when the support rod (2) is arranged in the hook portion (11), the limiting convex portion (12) cooperates with the hook portion (11) to clamp the support rod (2).

4. The belt adjustment and fixation hook according to claim 1, wherein, the hook portion (11) has an inner main surface (111) and an outer main surface (112) opposite thereto; and the inner main surface (111) is connected to the first main surface (101);
a second protruding portion (113) is arranged on an area facing the limiting convex portion (12) of the inner main surface (111); and the second protruding portion (113) is connected smoothly to the hook portion free end (114) of the hook portion (11), so that a first guiding slanted surface (115) is formed by the inner main surface (111) on the hook portion free end (114), which is convenient for the support rod (2) to be arranged in the hook portion (11).

5. The belt adjustment and fixation hook according to claim 4, wherein, the hook portion (11) has at least one second through hole (116) passing through the inner main surface (111) and the outer main surface (112); and the second through hole (116) extends from the hook portion base end (118) of the hook portion (11) to the hook portion free end (114) of the hook portion (11).

6. The belt adjustment and fixation hook according to claim 1, wherein, the belt installation frame portion (13) comprises:

a movable rod (131), wherein, one end of the movable rod (131) is connected to the body (10), and the other end of the movable rod (131) is a movable rod free end (133) rotatable around a connection point between the movable rod (131) and the body (10);

a fixing hook (132), wherein, one end of the fixing hook (132) is connected to the body (10), and the other end of the fixing hook (132) is formed into a fixing hook opening (134) configured for fixing the movable rod free end (133) to limit the movable rod (131).

7. The belt adjustment and fixation hook according to claim 6, wherein, the movable rod (131) is formed by being bent in advance to make the movable rod free end (133) be deviated from the fixing hook opening (134) and make the movable rod free end (133) be located on a side opposite to the fixing hook opening (134) of the fixing hook (132).

8. The belt adjustment and fixation hook according to claim 7, wherein, at least one gap (135) is defined in a side abutting the body (10) of the movable rod (131).

9. The belt adjustment and fixation hook according to claim 8, wherein, a fixing opening (136) is defined in a side away from the body (10) of the movable rod free end (133), which is configured to be fixed to the fixing hook (132) to make the movable rod (131) be limited by the fixing hook (132), when the movable rod (131) is arranged on the fixing hook (132).

10. The belt adjustment and fixation hook according to claim 6, wherein, a second guiding slanted surface (105) is arranged on an area facing the fixing hook opening (134) of the body (10), which is convenient for the movable rod free end (133) to slide into the fixing hook opening (134).

* * * * *